US006225557B1

(12) United States Patent
Fonteneau et al.

(10) Patent No.: US 6,225,557 B1
(45) Date of Patent: May 1, 2001

(54) CONNECTOR CASING FOR COAXIAL CABLES

(75) Inventors: Michel Fonteneau, Le Mans; Michel Lenoir, Montfort-le-Gesnois; Michel Pesson, Sille le Philippe, all of (FR)

(73) Assignee: Framatome Connectors International, Courbevoie (FR)

( * ) Notice: Subject to any disclaimer, the term of this patent is extended or adjusted under 35 U.S.C. 154(b) by 0 days.

(21) Appl. No.: 09/358,104

(22) Filed: Jul. 21, 1999

(30) Foreign Application Priority Data

Jul. 23, 1998 (FR) ........................................ 98/09419

(51) Int. Cl.[7] .............................................. H02G 15/02

(52) U.S. Cl. ....................................... 174/50; 439/456

(58) Field of Search ......................... 174/50, 68.1, 68.3, 174/48, 97, 135, 72 C, 59; 439/456, 459, 582, 610

(56) References Cited

U.S. PATENT DOCUMENTS 3,920,306 * 11/1975 Barnett, Jr. et al. ................ 439/459
3,958,300 * 5/1976 Tanaka ................................ 174/68.1
5,074,808 12/1991 Beamenderfer et al. ............ 439/606
5,244,415 9/1993 Marsilio et al. ...................... 439/610
5,725,395 * 3/1998 Lee ........................................ 439/610
5,753,855 * 5/1998 Nicoli et al. ........................... 174/49
5,777,270 * 7/1998 West et al. .......................... 174/99 B
5,820,412 * 10/1998 Koeget et al. ....................... 439/610
5,831,815 * 11/1998 Miller et al. ......................... 361/679
5,848,914 * 12/1998 Lang et al. ........................... 439/610
6,049,040 * 4/2000 Biles et al. .......................... 174/68.3

FOREIGN PATENT DOCUMENTS 0 631 351 A2 12/1994 (EP) .

* cited by examiner

*Primary Examiner*—Anthony Dinkins
*Assistant Examiner*—Adolfo Nino
(74) *Attorney, Agent, or Firm*—Perman & Green, LLP

(57) ABSTRACT

A connector casing which is a plastic molding and includes a connection face (1) in which a connection block (2) for coaxial cables (3) is located and an exit face (4) for the coaxial cables (3), which is perpendicular to the connection block (2), so that the cables describe a curved path between the connection block (2) and the exit face (4) for the cables.

The casing contains a cable guide (5, 6) for each cable (3), said cable guide being molded into the casing and extending with a predetermined radius of curvature in order to avoid any variation in the impedance of the cable (3).

8 Claims, 2 Drawing Sheets

CONNECTOR CASING FOR COAXIAL CABLES

BACKGROUND OF THE INVENTION

The present invention relates to a connector casing for coaxial cables.

It is known that coaxial cables comprise a central conductor surrounded by an insulating material covered with a tubular screen which is itself coated with insulation.

In a known manner, certain connector casings for coaxial cables are moulded from a plastic and comprise a connection face in which a connection block for the said coaxial cables is located and an exit face for these cables, which is perpendicular to the said connection face, so that the cables describe a curved path between the connection block and the exit face for the cables.

The technical problem usually encountered with this type of application specific to connectors for coaxial cables relates to maintaining the characteristic impedance of the cable over the entire length of its path through the casing as far as the connection to the coaxial contacts of the connector. This problem arises because, when the cable is deformed in an uncontrolled manner inside the casing, its impedance inevitably varies.

SUMMARY OF THE INVENTION

The object of the present invention is to create a connection casing allowing the cables to describe a controlled curved path inside the casing, thus avoiding any variation in their impedance.

According to the invention, this connector casing is characterized in that it contains a cable guide for each cable, the said cable guide being moulded into the casing and extending with a predetermined radius of curvature in order to avoid any variation in the impedance of the cable.

By virtue of such a cable guide, once the cable is put into position, the impedance of the cable can be precisely maintained as soon as the cable has been fitted and thereafter, whatever the stresses imposed on the cable which remains immobilized in this predetermined position.

In a preferred version of the invention, each cable guide consists of two parallel ribs extending in a circular arc having the said radius of curvature, the distance between the two ribs being approximately equal to the diameter of the cable extending between the two ribs.

The two ribs immobilize the cable without any play, so that there is no risk of the cable impedance varying according to the stresses to which it may be subjected.

Preferably, the connector casing comprises, close to the exit face for the cables, means for locking these cables relative to the casing.

BRIEF DESCRIPTION OF THE DRAWINGS

Further features and advantages of the invention will also appear in the description below.

In the appended drawings given by way of non-limiting examples.

DETAILED DESCRIPTION OF THE INVENTION

Figure 1:
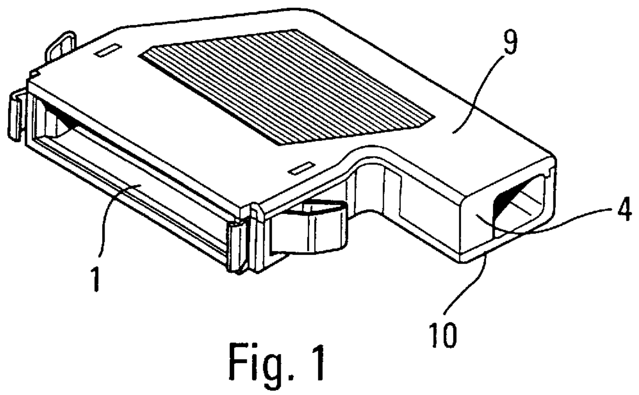
FIG. 1 is a perspective view of a connector casing according to the invention.
Figure 2:
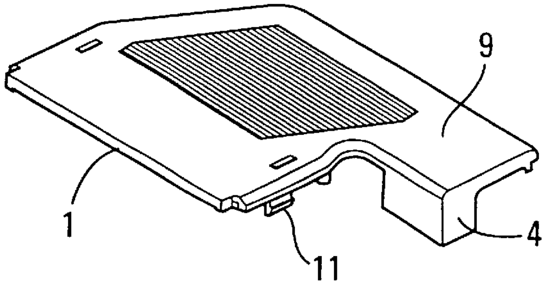
FIG. 2 is a perspective view showing the topside of one of the shells of the casing.

In the embodiment illustrated in the figures, the connector casing for coaxial cables is moulded from a plastic and comprises a connection face 1 in which a connection block 2 (see FIG. 6) for the coaxial cables 3 is located and an exit face 4 for these cables, which is perpendicular to the connection face 1. Consequently, the cables 3 describe a curved path between the connection block 2 and the exit face 4 for the cables 3.

According to the invention, the casing contains a cable guide 5, 6 for each cable 3, the said cable guide being moulded into the casing and extending with a predetermined radius of curvature in order to avoid any variation in the impedance of the cable 3.

Figure 4:
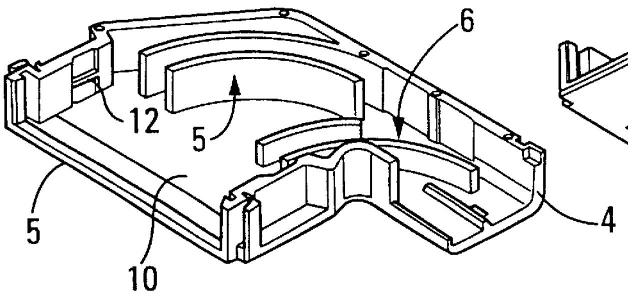
FIG. 4 is a perspective view showing the inside of the other shell of the casing.
Figure 5:
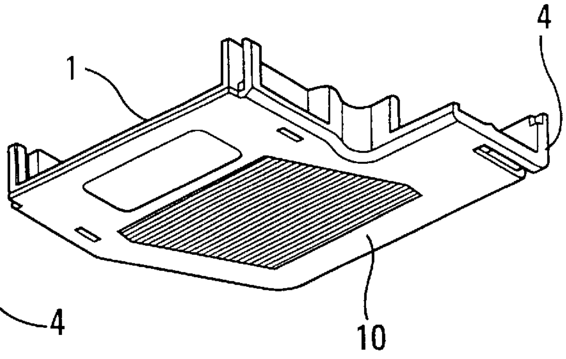
FIG. 5 is a perspective view showing the outside of this other shell.
Figure 6:
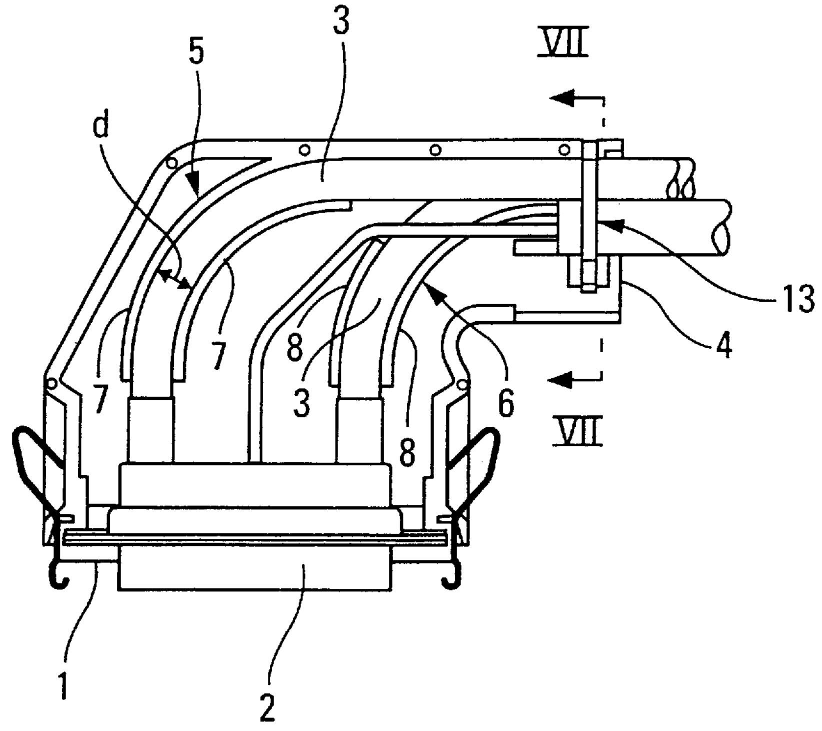
FIG. 6 is a plan view showing the inside of the connector casing, the coaxial cables being in place in the cable guides.
Figure 7:
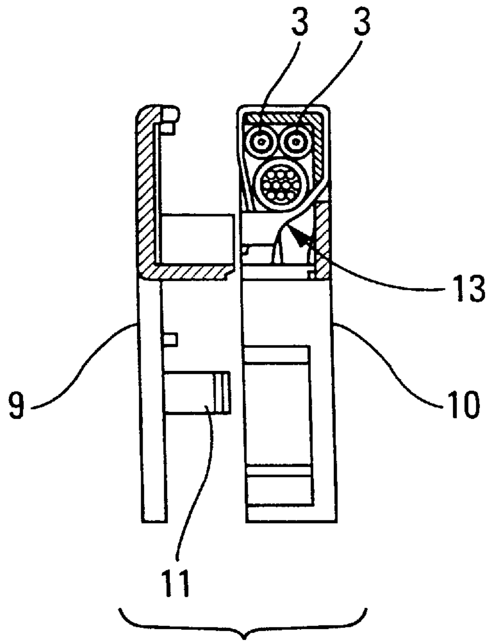
FIG. 7 is a view in section on the plan VII—VII in FIG. 6 of the two shells of the connector casing.

As shown in FIGS. 4 and 6, each cable guide 5, 6 consists of two parallel ribs 7, 8 extending in this circular arc having the above radius of curvature. The distance d between the two ribs 7, 8 is approximately equal to the diameter of the cable 3 extending between the two ribs.

As illustrated in FIGS. 2 to 5 and 7, the casing comprises two shells 9, 10 which are joined together.

One, 10, of the shells (see FIG. 4) carries the cable guides 5, 6.

Figure 3:
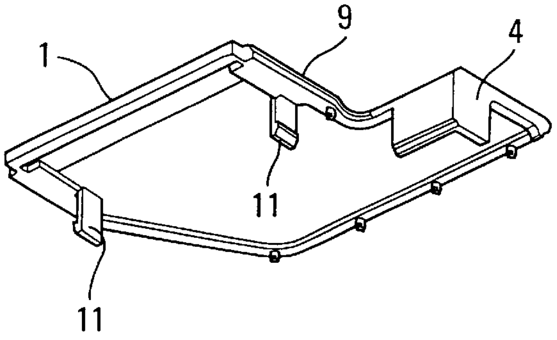
FIG. 3 is a perspective view showing the underside of the shell.

As shown particularly in FIG. 3, the shell 9 carries snap-fastening tabs 11 which engage (see FIG. 4) with complementary means 12 provided on the other shell 10 in order to join the two shells 9, 10 together.

Moreover, the connector casing comprises (see FIGS. 6 and 7), close to the exit face 4 for the cables 3, means 13 for locking these cables 3 relative to the casing.

These means 13 for locking the cables 3 consist of members, attached to the casing, for elastically gripping the cables 3.

In the example illustrated in FIGS. 4 and 6, the cable guides 5 and 6 have different radii of curvature. These radii of curvature are tailored to each cable 3, depending on the impedance that has to remain unchanged.

Because the cables are lodged without any play in the cable guides 5, 6 and these cables 3 are locked in place close to the exit face 4 by elastic clamping, there is no risk of these cables 3 being moved due to the effect of stresses external to the connector casing. Thus, their characteristic impedance remains strictly constant.

Of course, the invention is not limited to the example that has just been described and many modifications may be made to it without departing from the scope of the invention.

What is claimed is:

1. A connector casing for coaxial cables (3), the casing being a plastic moulding and comprising a connection face (1) in which a connection block (2) for connecting coaxial cables (3) is located, and an exit face (4) for the coaxial cables, said exit face is perpendicular to said connection block (2), so that the coaxial cables (3) describe a curved path between the connection block (2) and the exit face (4), characterized in that the casing contains a coaxial cable guide (5, 6) for each coaxial cable (3), each coaxial cable guide extending with a predetermined radius of curvature and being sized and shaped for holding the coaxial cable in a predetermined configuration along the coaxial cable guide and avoiding variation in an impedance of the coaxial cable.

2. A connector casing according to claim 1, characterized in that each cable guide (5, 6) comprises two parallel ribs (7, 8) extending in a circular arc having said radius of curvature, a distance (d) between the two ribs (7, 8) being approximately equal to a diameter of the cable (3) extending between the two ribs.

3. A connector casing according to claim 1, characterized in that the casing comprises two shells (9, 10) which are joined to each other, one of the shells carrying said cable guides (5, 6).

4. A connector casing according to claim 3, characterized in that one (9) of the shells carries snap-fastening tabs (11) which engage with complementary means (12) provided on the other shell (10) in order to join the two shells together.

5. A connector casing according to claim 1, characterized in that the casing comprises, close to the exit face (4) for the cables (3), means (13) for locking the cables (3) relative to the casing.

6. A connector casing according to claim 5, characterized in that said means (13) for locking the cables (3) comprises members attached to the casing for elastically gripping the cables (3).

7. A co-axial cable connector comprising:

a casing with an exit face through which co-axial cables in the casing exit the casing; and a connector block for terminating the co-axial cables in the casing, the connector block being mounted on the casing substantially perpendicular with respect to the exit face so that the co-axial cables describe a curved path between the connector block and exit face;

wherein the casing comprises at least one co-axial cable guide having a predetermined radius of curvature along the cable guide, the predetermined radius of curvature being selected to provide a co-axial cable a predetermined impedance when the co-axial cable is held by the cable guide, the predetermined impedance of the co-axial cable held by the cable guide being substantially constant along the cable between the exit face and connector block.

8. A co-axial cable connector as in claim 7, wherein the casing is a plastic molding, the cable guide being molded in the casing.

* * * * *